(12) United States Patent
Oh

(10) Patent No.: US 12,447,856 B2
(45) Date of Patent: Oct. 21, 2025

(54) POWER CONTROL DEVICE AND VEHICLE HAVING THE SAME

(71) Applicants: Hyundai Motor Company, Seoul (KR); Kia Corporation, Seoul (KR)

(72) Inventor: Insun Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 351 days.

(21) Appl. No.: 18/079,305

(22) Filed: Dec. 12, 2022

(65) Prior Publication Data

US 2023/0373344 A1 Nov. 23, 2023

(30) Foreign Application Priority Data

May 20, 2022 (KR) ........................ 10-2022-0061896

(51) Int. Cl.
    *B60L 58/12* (2019.01)
    *B60L 58/24* (2019.01)
    *H04L 12/40* (2006.01)

(52) U.S. Cl.
    CPC .............. *B60L 58/12* (2019.02); *B60L 58/24* (2019.02); *H04L 12/40* (2013.01); *B60L 2260/54* (2013.01); *H04L 2012/40215* (2013.01)

(58) Field of Classification Search
USPC .......................................................... 701/22
See application file for complete search history.

(56) References Cited

U.S. PATENT DOCUMENTS

2020/0114768 A1 * 4/2020 Oestreich ............. G01R 31/382
2021/0155173 A1 * 5/2021 Harata .................... G06F 8/654

* cited by examiner

*Primary Examiner* — Adam D Tissot
(74) *Attorney, Agent, or Firm* — Banner & Witcoff, Ltd.

(57) ABSTRACT

The present disclosure relates to a power control device and a vehicle having the same. The vehicle according to the present disclosure may include a battery configured to supply power to a plurality of loads, a communicator configured to perform first wired communication. The communicator may include a plurality of communication devices, and a communication controller. The vehicle may further include a power control device configured to communicate with the communicator via a first communication device of the plurality of communication devices and via the first wired communication, and control switching between power modes, based on a first communication state, of the first communication device, received via the first communication device, second communication states, of remaining communication devices, received via the first wired communication, and a battery charge amount.

16 Claims, 9 Drawing Sheets

POWER CONTROL DEVICE AND VEHICLE HAVING THE SAME

CROSS-REFERENCE TO RELATED APPLICATION

This application claims the benefit of Korean Patent Application No. 2022-0061896, filed on May 20, 2022 in the Korean Intellectual Property Office, the disclosure of which is incorporated herein by reference.

BACKGROUND

1. Field

Embodiments of the present disclosure relate to a power control device configured to control power of a battery supplied to electronic components in a vehicle.

2. Description of the Related Art

In general, vehicles include drive devices for driving, and further include various electronic components configured to protect passengers and provide convenience and fun to the passengers. For example, the electric components may include a power steering, a seat heating wire, a black box, and the like.

In addition, the vehicles further include a generator configured to generate power and supply the generated power to the drive devices and the electronic components and a battery configured to charge the power generated by the generator.

The vehicles supply power to some electronic components even when parked. As described above, electric current consumed by an electric load at all times when the vehicles are in the ignition OFF state is referred to as dark current.

In other words, the dark current may be current consumed when the electronic component is in a sleep mode.

Conventionally, a central communication device and a power control device of a vehicle have been implemented as one control device. In this case, when the vehicle is in the ignition OFF state, one control device has recognized the entire communication state and has determined whether to cut off the power supply, that is, whether to cut off the dark current in response to the recognized communication state.

However, recently, as a communication device and a power control device of a vehicle are physically separated, a power control device may not recognize a state of the entire network of a vehicle, and thus may not control the cutoff of the dark current flowing through some electronic components. In this case, when the vehicle is turned off, there is a problem of power loss and over-discharge of the battery, which causes a decrease in durability of the battery and a problem of poor starting.

SUMMARY

Therefore, it is an aspect of the present disclosure to provide a power control device configured to determine an in-vehicle communication state in an ignition OFF state and controls the cutoff of power supplied to a plurality of loads in response to the in-vehicle communication state, a charged amount of a battery, and an elapsed time of the ignition OFF state, and a vehicle having the same.

Additional aspects of the disclosure will be set forth in part in the description which follows and, in part, will be obvious from the description, or may be learned by practice of the disclosure.

In accordance with one or more aspects of the present disclosure, a power control device may include: a communicator configured to perform first wired communication and second wired communication; and a processor. The processor may be configured to: receive, via the second wired communication, a first communication state of a first communication device among a plurality of communication devices of a vehicle; receive, via the first wired communication, second communication states of remaining communication devices of the plurality of communication devices; and control switching between power modes based on: the first communication state, the second communication states, and a battery charge amount of the vehicle.

The power modes may include, a first power mode, a second power mode for supplying lower power than the first power mode, and a third power mode, in which power supply is cut off.

The processor may be further configured to determine whether the plurality of communication devices are, after receiving an ignition OFF command of the vehicle, in an active state; and operate in the first power mode based on a determination that the plurality of communication devices are in the active state.

The processor may be further configured to determine, based on the first communication state and the second communication states, whether to control the plurality of communication devices to operate in a sleep mode; and switch from the first power mode to the second power mode based on the plurality of communication devices operating in the sleep mode.

The processor may be further configured to: determine, based on the first communication state, whether the first communication device is in the sleep mode; and control the remaining communication devices to operate in the sleep mode based on receiving a predetermined control signal via the first wired communication.

The processor may be further configured to, when operating in the second power mode: based on a determination that the battery charge amount is smaller than a threshold charge amount, switch from the second power mode to the third power mode.

The processor may be further configured to: determine, based on the first communication state and the second communication states, whether to control the plurality of communication devices to operate in a sleep mode, and switch from the first power mode to the third power mode based on the battery charge amount, and further based on at least one of the plurality of communication devices operating in a non-sleep mode.

The processor may be further configured to: determine, based on the first communication state, whether the first communication device is in the sleep mode; and determine that at least one of the remaining communication devices is in the non-sleep mode based on receiving a predetermined control signal via the first wired communication.

The processor may be further configured to: based on a determination that a threshold time amount has elapsed since an ignition of the vehicle was disengaged, and further based on a determination that the battery charge amount is smaller than a threshold charge amount, switch from the first power mode to the third power mode.

The processor may be further configured to: based on a determination that the plurality of communication devices are in the sleep mode, and before a threshold time amount has elapsed since an ignition of the vehicle was disengaged, switch from the first power mode to the second power mode.

The first communication device may be configured to perform body controller area network (CAN) communication. The remaining communication devices may be configured to perform CAN communication other than the body CAN communication.

In accordance with one or more aspects of the present disclosure, a vehicle may include: a battery configured to supply power to a plurality of loads; a communicator configured to perform first wired communication, wherein the communicator comprises: a plurality of communication devices, and a communication controller. The vehicle may further include a power control device configured to: communicate with the communicator via a first communication device of the plurality of communication devices and via the first wired communication; and control switching between power modes based on: a first communication state, of the first communication device, received via the first communication device, second communication states, of remaining communication devices, received via the first wired communication, and a battery charge amount of the battery.

The first communication device may be configured to perform body controller area network (CAN) communication. The remaining communication devices may be configured to perform CAN communication other than the body CAN communication. The power modes may include: a first power mode, a second power mode for supplying lower power than the first power mode, and a third power mode, in which power supply is cut off.

The power control device may be further configured to: determine whether the plurality of communication devices are, after receiving an ignition OFF command of the vehicle, in an active state; and operate in the first power mode based on a determination that the plurality of communication devices are in the active state.

The power control device may be further configured to: determine, based on the first communication state, whether the first communication device is in a sleep mode; determine, based on receiving a predetermined control signal via the first wired communication and further based on the first communication device operating in the sleep mode, that the remaining communication devices are in the sleep mode; and switch from the first power mode to the second power mode based on the remaining communication devices operating in the sleep mode.

The power control device may be further configured to, based on a determination that the battery charge amount is smaller than a threshold charge amount, switch from the second power mode to the third power mode.

The power control device may be further configured to, when operating in the first power mode: determine that at least one communication device of the remaining communication devices is in a non-sleep mode based on receiving a predetermined control signal via the first wired communication; determine whether the battery charge amount is smaller than a preset charge amount based on the at least one communication device operating in the non-sleep mode or the first communication device operating in the non-sleep mode; and switch from the first power mode to the third power mode based on a determination that the battery charge amount is smaller than the preset charge amount.

The power control device may be further configured to switch from the first power mode to the second power mode based on a determination that the plurality of communication devices are in the sleep mode before a threshold time amount has elapsed since an ignition of the vehicle was disengaged.

The communication controller may be further configured to, after a threshold time amount has elapsed since an ignition of the vehicle is disengaged, monitor the first communication state and the second communication states; and control at least one communication device to operate in the sleep mode based on a determination that the at least one communication device is operating in the non-sleep mode.

The communication controller may be further configured to: output a first predetermined control signal via the first wired communication based on the remaining communication devices operating in a sleep mode; and output a second predetermined control signal via the first wired communication based on at least one of the remaining communication devices operating in a non-sleep mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
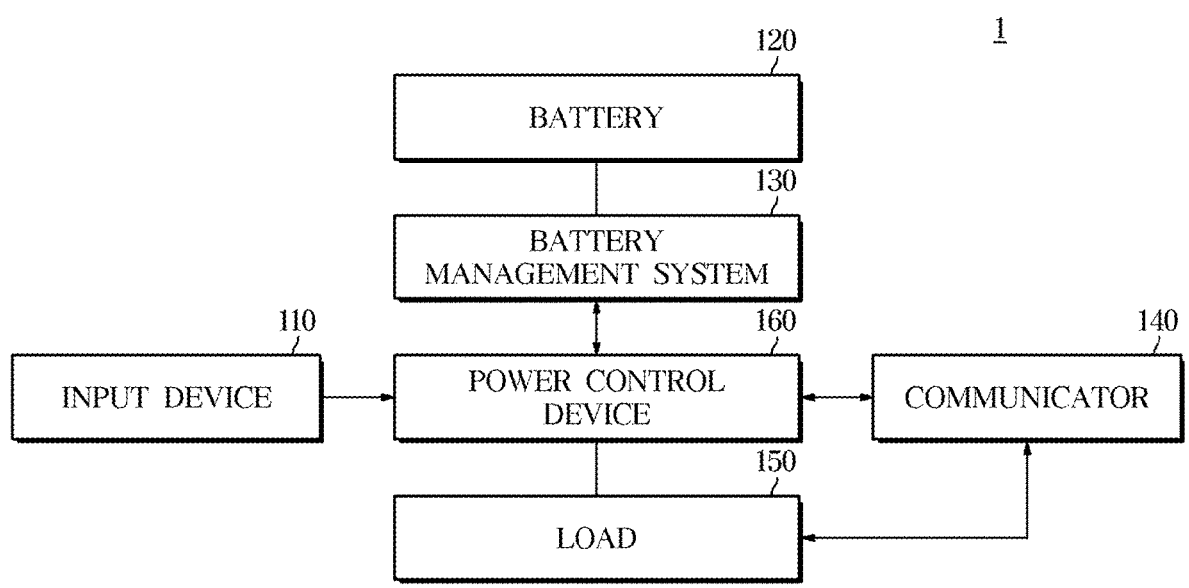
FIG. 1 is a configuration diagram of a vehicle provided with a power control device.

The same reference numerals refer to the same components throughout the specification. The specification does not describe all elements of the embodiments, and general contents in the art to which the present disclosure pertains or overlapping contents among the embodiments will be omitted. Terms "unit, module, member, and block" used in the specification may be implemented in software or hardware, and according to the embodiments, a plurality of "units, modules, members, and blocks" may be implemented as one component or one "unit, module, member, and block" may also include a plurality of components.

Throughout the specification, when a certain portion is described as being "connected" to another portion, it includes not only a case in which the certain portion is directly connected to another portion but also a case in which it is indirectly connected thereto, and the indirect connection includes a connection through a wireless communication network.

In addition, when a certain portion is described as "including" a certain component, it means that other components may be further included, rather than excluding the other components unless otherwise stated.

Throughout the specification, when a certain member is described as being positioned "on" another member, this includes not only a case in which the certain member comes into contact with another member but also a case in which another member is present between the two members.

Terms such as first and second are used to distinguish one component from another, and the components are not limited by the above-described terms.

The singular expression includes the plural expression unless the context clearly dictates otherwise.

In each operation, identification signs are used for convenience of description, and the identification signs do not describe the order of each operation, and each operation may be performed differently from the specified order unless the context clearly states the specific order.

Hereinafter, an operating principle and embodiments of the present disclosure will be described with reference to the accompanying drawings.

FIG. 1 is a configuration diagram of a vehicle provided with a power control device and will be described with reference to FIGS. 2 to 5.

Figure 2:
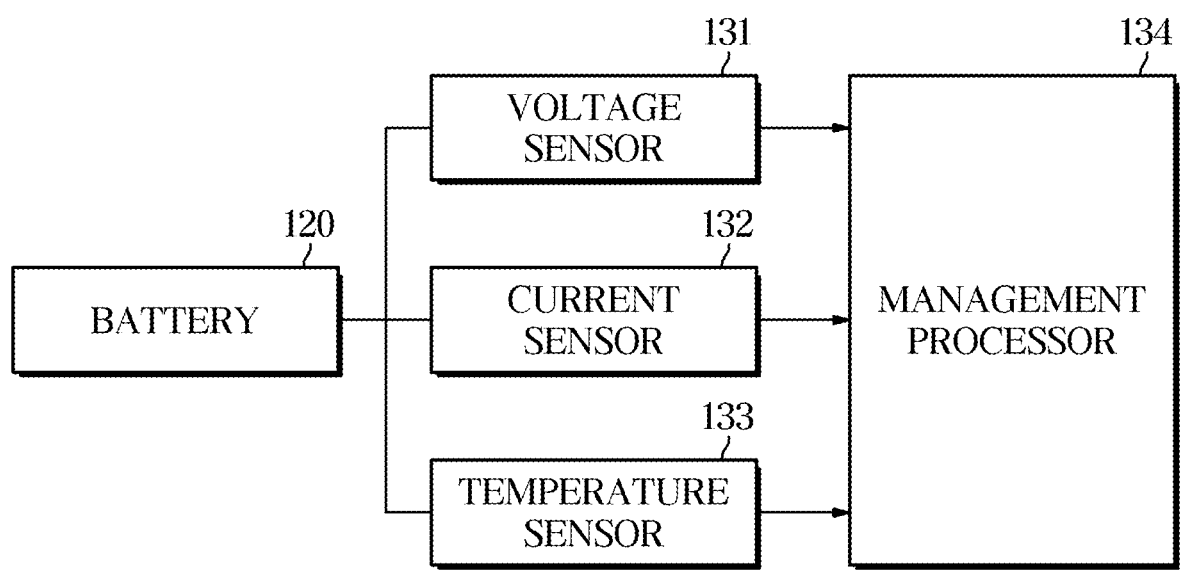
FIG. 2 is a configuration diagram of a battery management system provided in the vehicle.
Figure 3:
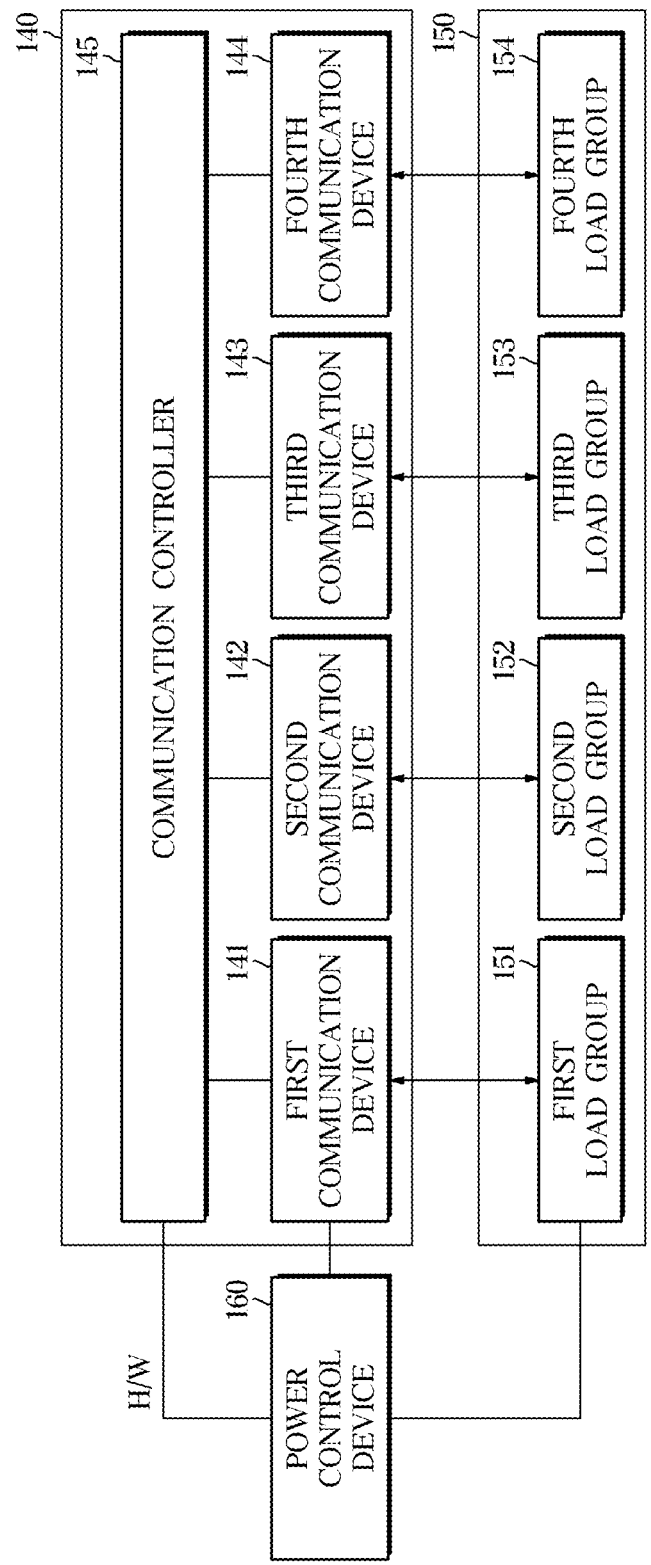
FIG. 3 is a configuration diagram of a communicator provided in the vehicle.
Figure 4:
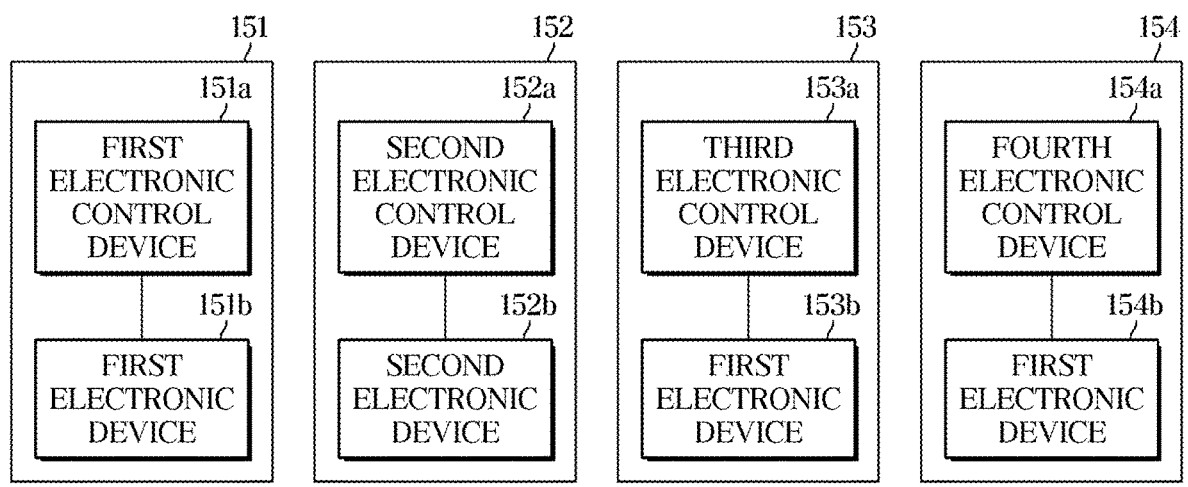
FIG. 4 is a configuration diagram of each load group provided in the vehicle.
Figure 5:
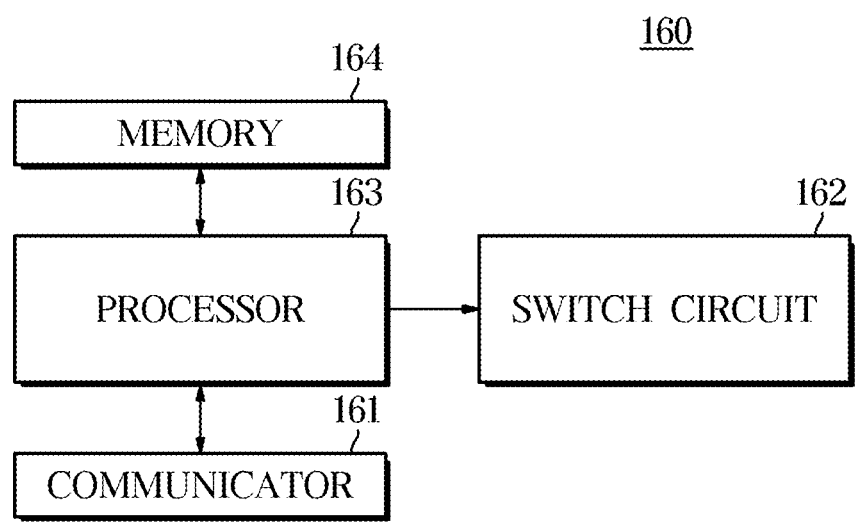
FIG. 5 is a configuration diagram of a power control device.

FIG. 2 is a configuration diagram of a battery management system provided in the vehicle, FIG. 3 is a configuration diagram of a communicator provided in the vehicle, FIG. 4 is a configuration diagram of each load group provided in the vehicle, and FIG. 5 is a configuration diagram of a power control device.

A vehicle 1 may include an input device 110, a battery 120, a battery management system 130, a communicator 140, a load 150, and a power control device 160.

The vehicle may be one of an internal combustion engine vehicle (general engine vehicle) configured to generate mechanical power by combusting petroleum fuels, such as gasoline and diesel, and travel using the mechanical power and an eco-friendly vehicle configured to travel using electricity as power in order to decrease fuel consumption and harmful gas emissions.

The eco-friendly vehicle may include an electric vehicle including a battery (also referred to as a "main battery") and a motor as a power device and configured to rotate the motor with electricity accumulated in the battery and drive wheels using the rotation of the motor, a hybrid vehicle including an engine, a battery, and a motor and configured to travel by controlling mechanical power of the engine and electrical power of the motor, and a hydrogen fuel cell vehicle.

The input device 110 may receive a user input.

The input device 110 may include a start button. The start button may receive an ignition ON command and an ignition OFF command.

The input device 110 may be provided on a head unit or a center fascia and includes at least one physical button, such as operation ON/OFF buttons for various functions and buttons configured to change setting values of the various functions.

The input device 110 may be provided on the head unit or the center fascia of the vehicle 1, and may be provided as at least one of a button, a switch, a key, a touch panel, a jog dial, a pedal, a keyboard, a mouse, a track-ball, various levers, a handle, and a stick.

The input device 110 may receive a cursor movement command, a selection command, and the like displayed on a display (not shown).

The input device 110 may be implemented as a touch screen provided integrally with the display (not shown).

The input device 110 may receive selection information of a function to be performed while the vehicle is in a parked state. In other words, the vehicle may control an operation of at least one electronic device in the parked state based on the selection information of a function received by the input device 110.

The battery 120 may supply power to various loads provided in the vehicle 1. Here, the load may be an electronic device.

In other words, the battery 120 may also be electrically connected to electronic devices, such as various convenience devices and additional devices provided in the vehicle 1, and configured to supply drive power to the respective electronic devices.

The battery 120 may supply power to a preset electronic device in a parking mode.

The battery 120 may supply power to the electronic device configured to perform a preset function in the parking mode.

The battery 120 may be a chargeable and dischargeable battery.

If the vehicle is the internal combustion engine vehicle or the hybrid electric vehicle, the battery 120 may supply power to a start motor after receiving the ignition ON command of the vehicle. The battery 120 may be charged using power generated by a generator in a traveling state.

If the vehicle is the internal combustion engine vehicle or the hybrid electric vehicle, the vehicle may supply the power generated from the generator (or an alternator) to a plurality of electronic devices in the traveling state and supply the power charged in the battery 120 in the parked state to at least one of the plurality of electronic devices.

If the vehicle is the eco-friendly vehicle, the battery 120 may supply power to at least one electronic device provided in the eco-friendly vehicle for user convenience in the traveling state or the parked state.

If the vehicle is the eco-friendly vehicle, the battery 120 may be charged using power supplied from the main battery in the traveling state.

The battery management system 130 may monitor a charge state of the battery 120 and transmit state information on the charge state of the battery 120 to the power control device 160.

The battery management system 130 may acquire state information on the battery 120.

The battery management system 130 may include a plurality of sensors configured to collect information on states of the battery 132, such as an output voltage of the battery 120, input/output currents of the battery 120, and a temperature of the battery 120.

The battery management system 130 may include a management processor 134 configured to calculate and manage a state of charge (SoC) of the battery 132 and a state of health (SoH) of the battery 120 based on the information on the state of the battery 120.

As shown in FIG. 2, the battery management system 130 may include a voltage sensor 131 configured to detect a voltage at an output terminal of the battery 120.

The battery management system 130 may further include a current sensor 132 configured to detect a current of the battery 120 and further include a temperature sensor 133 configured to detect the temperature of the battery 120.

The management processor 134 monitors the SoC of the battery 120 based on the voltage of the battery detected by the voltage sensor 131.

The management processor 134 may monitor the SoC of the battery 120 based on the current of the battery detected by the current sensor 132.

The management processor 134 monitors the SoC of the battery 120 based on the voltage of the battery detected by the voltage sensor 131, the current of the battery detected by the current sensor 132, and the temperature of the battery detected by the temperature sensor 133.

Here, the SoC of the battery 120 may include a battery charge amount of the battery.

The management processor 134 may acquire the SoC of the battery corresponding to the current, voltage, and temperature of the battery from a pre-stored table. In the pre-stored table, the battery charge amount corresponding to the correlation of the current, voltage, and temperature of the battery may be matched.

The management processor 134 may monitor the SoC of the battery 120 in the parked state.

The battery management system 130 may include one or more communication devices configured to enable the communication with components inside the vehicle 1 and include, for example, at least one of a short-range communication device, a wired communication device, and a wireless communication device.

The management processor 134 of the battery management system (BMS) 130 may also be implemented as one processor with a processor of the power control device 160.

The communicator 140 communicates with the power control device 160 and performs communication between various loads inside the vehicle.

The communicator 140 is connected to each of a plurality of electronic control devices configured to control the plurality of electronic devices by wire, and transmits and receives at least one of a control signal, an operation signal, and a detection signal between different electronic control devices by wire.

The control signal may be a signal for controlling the electronic device, and the operation signal may be a signal corresponding to an operating state of the electronic device.

The communicator 140 may include one or more components configured to enable the communication with external devices, such as servers, mobiles, and other vehicles, and include, for example, at least one of a short-range communication device, a wired communication device, and a wireless communication device.

The short-range communication device may include various short-range communication devices configured to transmit and receive a signal using a wireless communication network in a short range, such as a Bluetooth module, an infrared communication device, a radio frequency identification (RFID) communication device, a wireless local access network (WLAN) communication device, an NFC communication device, and a Zigbee communication device.

The wired communication device may include not only various wired communication devices, such as a controller area network (CAN) communication device, a local area network (LAN) module, a wide area network (WAN) module, and a value added network (VAN) module, but also various cable communication devices, such as a universal serial bus (USB), a high definition multimedia interface (HDMI), a digital visual interface (DVI), a recommended standard232 (RS-232), power line communication, or a plain old telephone service (POTS). Here, the local area network (LAN) module is the most representative Ethernet communication having a bus structure method.

In addition to the Wi-Fi module and the wireless broadband module, the wireless communication device may include a wireless communication device configured to support various wireless communication methods, such as a global system for mobile communication (GSM), a code division multiple access (CDMA), a wideband code division multiple access (WCDMA), a universal mobile telecommunications system (UMTS), time division multiple access (TDMA), and long term evolution (LTE).

As shown in FIG. 3, the communicator 140 may include a plurality of communication devices 141, 142, 143, and 144 and a communication controller 145.

Each of the communication devices 141, 142, 143, and 144 may be connected to one or a plurality of loads.

The one or the plurality of loads connected to each communication device may be grouped according to an installation area and grouped with a similar function or the same function. In other words, the one or plurality of loads may be grouped through a domain.

The load 150 may be one of a detection device, an electronic device, and an electronic control device. The load 150 will be described in detail below.

Each of the communication devices 141, 142, 143, and 144 may be connected to at least one of the electronic control device, the electronic device, and the detection device through two communication lines, that is, a high line and a low line, may transmit a control signal to at least one device connected by wire, receive an operation signal from at least one device connected by wire, and receive a control signal to be transmitted from one device to another device.

The plurality of communication devices 141, 142, 143, and 144 may be modules configured to perform different CAN communication.

The plurality of communication devices 141, 142, 143, and 144 may be classified into a low-speed CAN communication device and a high-speed CAN communication device according to a communication speed for transmitting and receiving signals. Here, the low-speed CAN communication device may be a CAN communication device having a communication speed lower than a reference speed, and the high-speed CAN communication device may be a CAN communication device having a communication speed higher than or equal to the reference speed.

The low-speed CAN communication device may include a multimedia CAN (M-CAN) communication device configured to communicate with an audio device, a radio device, and an audio/video/navigation (AVN) device, and a body CAN (B-CAN) communication device configured to transmit and receive signals for operating various electronic devices, such as a cluster, a door lock device, a lamp, a wiper, a seat, and a heater.

The high-speed CAN communication device may include a power train CAN (P-CAN) communication device configured to transmit and receive signals for controlling a power train, stability control (an auto-lock brake system (ABS), a transmission control unit (TCU), a tire pressure monitoring system (TPMS), an active suspension, and the like), and a shift function in real time, and a chassis CAN (C-CAN) communication device configured to control an electronic parking brake (EPB) and the like, and include a diagnosis CAN (D-CAN) communication device configured to diagnose errors.

For example, a first communication device 141 may be the body CAN (B-CAN) communication device, a second communication device 142 may be the multimedia CAN (M-CAN) communication device, a third communication device 143 may be the power train CAN (P-CAN) communication device, and a fourth communication device 144 may be the chassis CAN (C-CAN) communication device.

The communication controller 145 may monitor network states, that is, communication states, of the plurality of communication devices 141, 142, 143, and 144 and the power control device 160.

The communication controller 145 may enable the communication between electronic control devices by controlling the CAN communication between the plurality of communication devices 141, 142, 143, and 144.

The communication controller 145 may manage at least one electronic control device and control an operation of the at least one electronic control device by performing the CAN communication with at least one of the plurality of communication devices 141, 142, 143, and 144.

The communication controller 145 may perform the CAN communication with the power control device 160 and perform wired communication other than the CAN communication. Here, the wired communication other than the CAN communication will be referred to as first wired communication H/Wire.

Here, the first wired communication H/Wire may be communication for transmitting a predetermined control signal (e.g., a high signal or a low signal).

The communication controller 145 may receive a signal corresponding to an operation mode or a sleep mode from the plurality of communication devices 141, 142, 143, and 144. For example, the communication controller 145 may receive a CAN signal corresponding to the operation mode from the plurality of communication devices 141, 142, 143, and 144 while the vehicle is in the traveling state and receive a CAN signal corresponding to the sleep mode from at least one of the plurality of communication devices 141, 142, 143, and 144 while the vehicle is in the parked state.

If the vehicle is in the parked state or the ignition OFF state, the communication controller 145 may output a first predetermined control signal (e.g., a high signal) to the power control device 160 through the first wired communication in response to receiving an execution signal of the sleep mode from all communication devices 141, 142, 143, and 144, and output a second predetermined control signal (e.g., a low signal) to the power management device 160 through the first wired communication in response to receiving the execution signal of the sleep mode from at least one communication device and an execution signal of a non-sleep mode from the remaining communication devices.

Here, the high signal may be a voltage signal of about 5 V, and the low signal may be a voltage signal of about 0 V.

After a preset time elapses from a time point at which the ignition is turned off, the communication controller 145 monitors the plurality of communication devices, determines whether all communication devices are in the sleep mode based on the monitored information, transmits the first predetermined control signal (e.g., a high signal) to the power management device 160 through the first wired communication if it is determined that all communication devices are in the sleep mode, and transmits the second predetermined control signal (e.g., a low signal) to the power management device 160 through the first wired communication if it is determined that at least one communication device is in the sleep mode and the remaining communication devices are in the non-sleep mode. Here, the non-sleep mode may be an operation mode.

The communication controller 145 may also determine whether the first communication device has woken up or is in the non-sleep mode after the preset time elapses from the time point at which the ignition is turned off. The communication controller 145 may also control the switching to the sleep mode if it is determined that the first communication device has woken up or is in the non-sleep mode.

The communication controller 145 may also control the reset of the plurality of communication devices after the preset time elapses from the time point at which the ignition is turned off.

A plurality of loads 150 may be provided.

Each load 150 may be provided in the vehicle 1, and may be an electronic device and an electronic control device configured to perform one or more functions or may also be a detection device.

Here, the function performed in the vehicle may include a traveling function for traveling, a safety function for safety, a convenience function for user convenience, and the like.

The electronic control device may be an electronic control unit (ECU).

The electronic device may be an input device or an output device configured to operate in response to the control command of the electronic control device.

The plurality of loads provided in the vehicle will be described as an example.

The electronic device is an electronic device configured to perform the traveling function, and may include a power generation device, a power transmitting device, a steering device, a braking device, a suspension device, and a transmission device.

The electronic control device controls the electronic device configured to perform the traveling function, and one or more electronic control devices may be provided.

The electronic device is an electronic device for user convenience, and may include a seat position adjustment member, a cluster, an input device, and a display and include an air conditioner, a radio device, an audio device, a video device, a seat heating device, a navigation device, a black box device, an autonomous traveling device, and the like.

The electronic control device controls the electronic device for user convenience, and one or more electronic control devices may be provided.

The electronic device is an electronic device for user safety, and may include a warning system configured to output warning information in a dangerous situation so that a driver recognizes the dangerous situation of an accident and an automatic emergency braking system (AEBS) configured to perform emergency braking by operating the braking device and lowering an output of the engine if another vehicle is positioned in front of his/her own vehicle within a certain distance from his/her own vehicle and include an airbag control device, an electronic stability control (ESC) configured to control a posture of the vehicle if the vehicle accelerates or turns, a tire pressure monitoring system (TPMS), and an anti-lock brake system (ABS) configured to prevent the wheels from locking upon sudden braking, and the like.

The electronic device is an electronic device for user safety, and may further include a camera of a surround view monitor (SVM) (or around view monitor (AVM)), a camera of a blind spot detection (BSD) device, or a camera of a rear detection device.

The warning system may include a lane departure warning system (LDWS) that notifies the departure of his/her own lane, a drowsiness warning system configured to notify the driver that the driver is drowsy, a blind spot warning system (BSW) (or a blind spot assist (BSA) system or a blind spot detection (BSD) system) configured to notify the risk of collision with other vehicles positioned in the left and right lanes of his/her own lane, and a forward collision warning system (FCWS) (or a back warning system (BWS)) configured to notify the risk of collision with other vehicles positioned in front of and behind his/her own vehicle.

The electronic control device controls the electronic device for user safety, and one or more electronic control devices may be provided.

The plurality of loads may be grouped by domain.

Here, the domain refers to the same attribute or a similar attribute, the same purpose or a similar purpose, and the same installation position or a similar installation position.

For example, if the domain is a purpose and an installation position, a first domain may be autonomous traveling, a second domain may be convenience, a third domain may be an interior of the vehicle, and a fourth domain may be a power train (i.e., a power device).

For another example, if the domain is an attribute and it is a time point after power is supplied and the ignition OFF, the first domain may be a regular time point, the second domain may be a cycle time point, and the third domain may be an event time point. In this case, a first load group may be a regular load group operated by receiving power at all times in the ignition OFF state, that is, in the parked state, a second load group may be a periodical load group periodically operated by periodically receiving power, and a third load group may be an event-type load group operated by receiving power if an event occurs.

For another example, if the domain is an attribute and it is a communication method, the first domain may be body-CAN (B-CAN) communication, the second domain may be multimedia-CAN (M-CAN) communication, the third domain may be power train CAN (P-CAN) communication, and the fourth domain may be chassis CAN (C-CAN) communication.

As shown in FIG. 4, the plurality of loads may be classified into a first load group 151, a second load group 152, a third load group 153, and a fourth load group 154.

The first load group 151 may include a first electronic control device 151a and a first electronic device 151b configured to perform communication through the B-CAN communication. Here, one or more first electronic control devices 151a may be provided, and one or more first electronic devices 151b may be provided.

The first electronic control device 151a may control an operation of the first electronic device 151b based on a control signal received through the first communication device 141, and transmit operation information of the first electronic device 151b to the first communication device 141.

The second load group 152 may include a second electronic control device 152a and a second electronic device 152b configured to perform communication through the M-CAN communication. Here, one or more second electronic control devices 152a may be provided, and one or more second electronic devices 152b may be provided.

The second electronic control device 152a may control an operation of the second electronic device 152b based on a control signal received through the second communication device 142, and transmit operation information of the second electronic device 152b to the second communication device 142.

The third load group 153 may include a third electronic control device 153a and a third electronic device 153b configured to perform communication through the P-CAN communication. Here, one or more third electronic control devices 153a may be provided, and one or more third electronic devices 153b may be provided.

The third electronic control device 153a may control an operation of the third electronic device 153b based on a control signal received through the third communication device 143, and transmit operation information of the third electronic device 153b to the third communication device 143.

The fourth load group 154 may include a fourth electronic control device 154a and a fourth electronic device 154b configured to perform communication through the C-CAN communication. Here, one or more fourth electronic control devices 154a may be provided, and one or more fourth electronic devices 154b may be provided.

The fourth electronic control device 154a may control an operation of the fourth electronic device 154b based on a control signal received through the fourth communication device 144, and transmit operation information of the fourth electronic device 154b to the fourth communication device 144.

The electronic devices in each load group may receive a control signal from the electronic control device in the same load group, and directly receive a control signal from the communication device connected to the load group to which the electronic device belongs.

The electronic control devices and the electronic devices may communicate with each other through a vehicle communication network NT. For example, the electronic control devices and the electronic devices may transmit and receive data through an Ethernet, a media oriented systems transport (MOST), a Flexray, a local interconnection network (LIN), and the like.

The power control device 160 controls power supply to various loads provided in the vehicle or controls the power supply to be cut off. The power control device will be described with reference to FIGS. 5 to 7.

Figure 6:
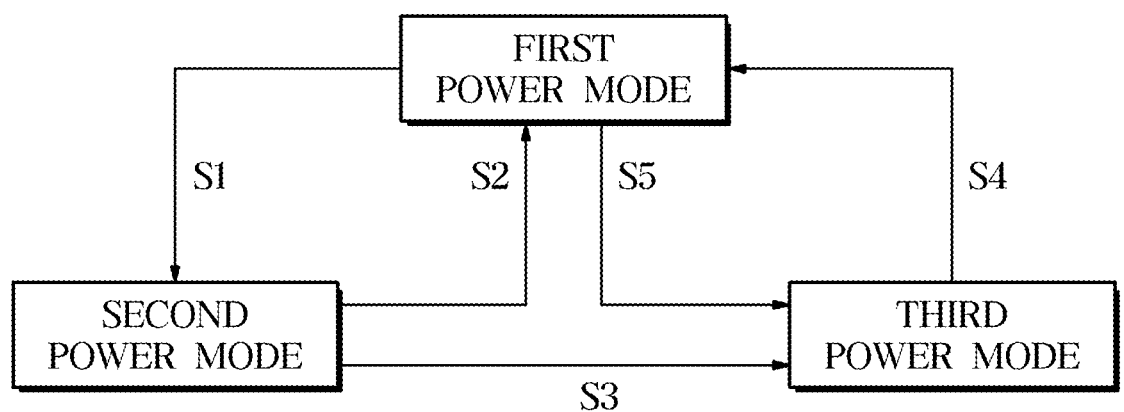
FIG. 6 is an exemplary view of a power mode of the power control device.
Figure 7:
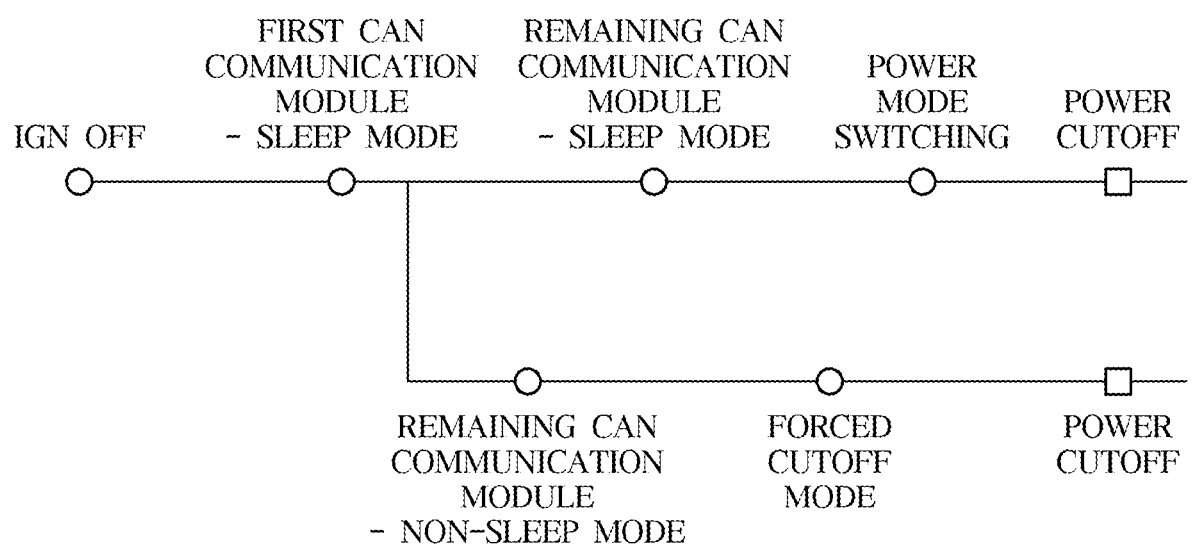
FIG. 7 is an exemplary view of power cutoff corresponding to a communication state performed by the power control device.

FIG. 5 is a configuration diagram of a power control device, FIG. 6 is an exemplary view of a power mode of the power control device, and FIG. 7 is an exemplary view of power cutoff corresponding to a communication state performed by the power control device.

As shown in FIG. 5, the power control device 160 includes a communicator 161, a switch circuit 162, a processor 163, and a memory 164.

The communicator 161 may include one or more components configured to enable communication between components inside the vehicle, and include, for example, at least one of a short-range communication device, a wired communication device, and a wireless communication device.

Since the short-range communication device and the wired communication device are the same as the configurations of the short-range communication device and the wired communication device in the communicator 140, descriptions thereof will be omitted.

The communicator 161 may include a first interface to which the first wired communication W/Wire is connected and a second interface to which the first communication device 141 is connected.

The first communication device 141 is a CAN communication device configured to perform the B-CAN communication and performs wired communication.

In other words, the first communication device may be second wired communication.

The first wired communication W/Wire may be connected to the communication controller 145. The first wired communication W/Wire may receive a control signal (e.g., a high signal or a low signal) from the communication controller 145 and transmit the received control signal (e.g., a high signal or a low signal) to the processor 163.

The first wired communication W/Wire may be provided in a structure in which wake-up is impossible so that the first communication device 141 is normally maintained in the sleep mode.

The switch circuit 162 may include a plurality of switches connected to the plurality of load groups 151, 152, 153, and 154. Each switch may include a relay.

Each of the switches may be turned on or off in response to a control command of the processor 163.

Each switch may be connected to the battery 120 so that the power of the battery 120 is supplied to one or more loads if the switch is turned on, and the power supplied from the battery 120 may be cut off if the switch is turned off.

The processor 163 may allow power to be supplied to the plurality of electronic devices, the plurality of electronic control devices, and the plurality of detection devices in response to the state of the vehicle, or may cut off the power supply thereto.

The processor 163 may turn on one or more switches so that the power of the battery 120 is supplied to one or more load groups.

The processor 163 may turn off one or more switches so that the power supply of the battery 120 to one or more load groups are cut off.

The processor 163 may switch the power mode if the processor 163 receives a remote control signal from the outside in an ignition OFF state.

The remote control signal is a signal received from a remote controller, a user terminal, or a server and, may include at least one of a door unlock signal and an ignition ON signal.

If the processor 163 receives the ignition OFF command through the input device 110, the processor 163 may determine that the vehicle is in the parked state and switch the power mode.

As shown in FIG. 6, the processor 163 may perform any one of a first power mode, a second power mode, and a third power mode.

The first power mode is a mode in which high power is supplied to the load, the second power mode is a mode in which low power is supplied to the load, and the third power mode is a mode in which the power supplied to the load is cut off.

The power supplied in the first power mode may be higher than the power supplied in the second power mode.

Here, the second power mode may be a mode in which a dark current is supplied.

The processor 163 may switch the first power mode to the second power mode (S1), the second power mode to the first power mode (S2), the second power mode to the third power mode (S3), the third power mode to the first power mode (S4), or the first power mode to the third power mode (S5) in response to the communication state of the communicator.

The processor 163 determines whether the states of the communication devices are active states in the parked state, and controls the execution of the first power mode if it is determined that the states of the communication devices are the active states.

The processor 163 switches the first power mode to the second power mode (S1) if the first communication devices are in the sleep mode or if a predetermined control signal (e.g., a high signal) through the first wired communication is received in the parked state.

The processor 163 may determine that the vehicle is in the traveling state, and switch the second power mode to the first power mode (S2) if the processor 163 receives the ignition ON command through the input device 110 while performing the second power mode.

The processor 163 may switch the second power mode to the third power mode (S3) if the battery charge amount is smaller than a preset charge amount while performing the second power mode.

The processor 163 may determine that the vehicle is in the traveling state, and switch the third power mode to the first power mode (S4) if the processor 163 receives the ignition ON command through the input device 110 while performing the third power mode.

The processor 163 may switch the first power mode to the third power mode (S5) if the battery charge amount is smaller than the preset charge amount while performing the first power mode.

As shown in FIG. 7, the processor 163 determines whether the first communication device 141 connected to the power control device is in the sleep mode if the processor 163 receives the ignition OFF command, and determines whether the remaining communication devices 142, 143, and 144 are in the sleep mode if it is determined that the first communication device 141 is in the sleep mode.

The processor 163 may switch the first power mode to the second power mode if it is determined that the first communication device 141 is in the sleep mode and the remaining communication devices 142, 143, and 144 are also in the sleep mode, and switch the second power mode to the third power mode (S3) if the battery charge amount is smaller than the preset charge amount while performing the second power mode.

The processor 163 may perform a forced cutoff mode if it is determined that the first communication device 141 is in the sleep mode but at least one of the remaining communication devices 142, 143, and 144 is not in the sleep mode.

While performing the forced cutoff mode, the processor 163 may determine whether a preset time has elapsed from the time point at which the ignition is turned off, determine whether the battery charge amount is smaller than the preset charge amount if it is determined that the preset time has elapsed from the time point at which the ignition is turned off, and switch the first power mode to the third power mode if it is determined that the battery charge amount is smaller than the preset charge amount. Therefore, the power supplied to the load may be cut off. In other words, the supply of the dark current may be cut off.

The processor 163 may determine whether the first communication device 141 and the remaining communication devices 142, 143, and 144 are in the sleep mode if it is determined that the battery charge amount is greater than or equal to a reference charge amount after the preset time has elapsed from the time at which the ignition is turned off, and switch the first power mode to the second power mode if it is determined that the first communication device 141 and the remaining communication devices 142, 143, and 144 are all in the sleep mode.

While the remaining communication devices 142, 143, and 144 are in the sleep mode, the processor 163 may receive a first predetermined control signal (e.g., a high signal) from the communicator 140. In other words, if the processor 163 receives the first predetermined control signal (e.g., a high signal) through the first wired communication, the processor 163 may determine that the remaining communication devices 142, 143, and 144 are in the sleep mode.

While at least one of the remaining communication devices 142, 143, and 144 is in the non-sleep mode, the processor 163 may receive a second predetermined control signal (e.g., a low signal) from the communicator 140. In other words, if the processor 163 receives the second predetermined control signal (e.g., a low signal) through the first wired communication, the processor 163 may determine that at least one communication device is in the non-sleep mode.

The first predetermined control signal (e.g., a high signal) received from the communicator 140 may be a signal transmitted if the remaining communication devices, except for the first communication device 141, are in the sleep mode. In this case, the processor 163 may determine whether the first communication device is in the sleep mode through communication with the first communication device.

In addition, the first predetermined control signal (e.g., a high signal) received from the communicator may also be a signal transmitted if all communication devices, including the first communication device 141, are in the sleep mode.

The processor 163 may monitor the battery charge amount 120.

The processor 163 may also receive information on the battery charge amount 120 from the battery management system 130.

The processor 163 may also receive the voltage of the battery detected by the voltage sensor 131, the current of the battery detected by the current sensor 132, and the temperature of the battery detected by the temperature sensor 133, and monitor the charge state of the battery 120 based on the received voltage of the battery, the received current of the battery, and the received temperature of the battery.

The processor 163 may confirm the battery charge amount through monitoring the SoC of the battery 120.

The processor 163 may also be implemented as one with the management processor 134 of the battery management system 130.

The processor 163 may be a memory (not shown) configured to store data on an algorithm for controlling the operations of the components in the vehicle 1 or a program reproducing the algorithm and a processor (not shown) configured to perform the above-described operations using the data stored in the memory. In this case, the memory and the processor 163 may be implemented as separate chips, respectively. Alternatively, the memory and the processor may also be implemented as a single chip.

The memory 164 may store identification information for the electronic control device and the electronic device belonging to each load group, store identification information for the switch connected to each load group, and store information on the communication device connected to each load group.

The memory 164 may store information on the preset time and the preset charge amount.

The memory 164 may be implemented as at least one of non-volatile memory devices, such as a cache, a read only memory (ROM), a programmable ROM (PROM), an erasable programmable ROM (EPROM), an electrically erasable programmable ROM (EEPROM), and a flash memory, volatile memory devices, such as a random access memory (RAM), or storage media, such as a hard disk drive (HDD) and a CD-ROM, but the present disclosure is not limited thereto.

The memory 164 and the processor 163 may be implemented as separate chips, respectively. Alternatively, the memory 164 and the processor 163 may be implemented as a single chip.

Meanwhile, each component shown in FIGS. 1, 2, 3, 4, and 5 refers to software and/or hardware components, such as a field programmable gate array (FPGA) and an application specific integrated circuit (ASIC).

Figure 8:
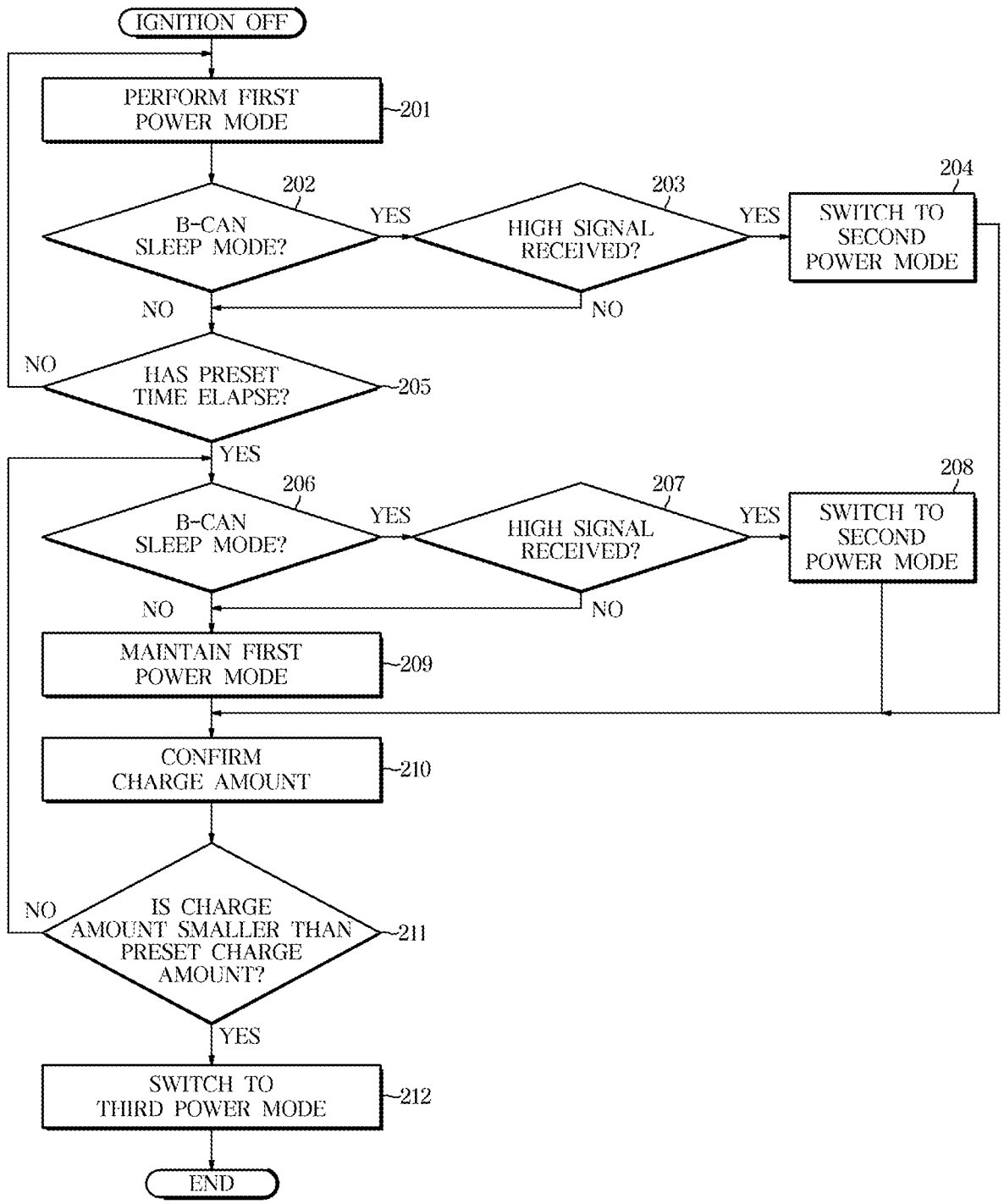
FIG. 8 is a flowchart of the power control device.
Figure 9:
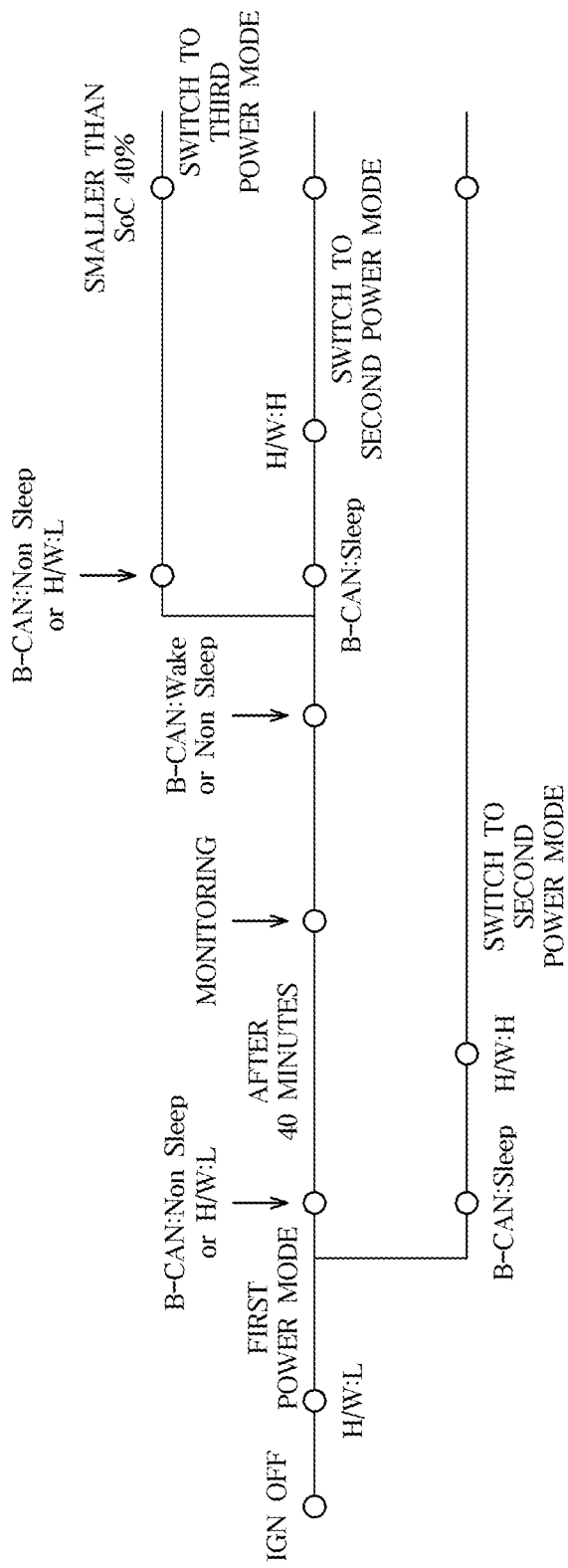
FIG. 9 is a detailed exemplary view of the power cutoff corresponding to the communication state performed by the power control device.

At least one component may be added or deleted depending on the performance of the components shown in FIGS. 1, 2, 3, 4, and 5. In addition, it will be readily understood by those skilled in the art that the mutual positions of the components may be changed depending on the performance or structure of the system FIG. 8 is a flowchart of the power control device and will be described with reference to FIG. 9.

The power control device 160 performs the ignition OFF if the power control device 160 receives the ignition OFF command through the input device 110.

The power control device 160 may determine that the vehicle is in the parked state if the power control device 160 receives the ignition OFF command through the input device 110.

The power control device 160 may monitor the battery charge amount 120 in the parked state.

The power control device 160 may receive SoC information of the battery from the battery management system 130, and monitor the battery charge amount 120 based on the received SoC information.

The power control device 160 may also receive the voltage of the battery detected by the voltage sensor 131, the current of the battery detected by the current sensor 132, and the temperature of the battery detected by the temperature sensor 133, and monitor the SoC of the battery 120 based on the table stored in the memory 164 and the received voltage, current, and temperature of the battery.

The power control device 160 may determine whether the states of the plurality of communication devices are the active states in the parked state, and perform the first power mode (201) if it is determined that the states of the plurality of communication devices are the active states.

The power control device 160 may determine the states of the plurality of communication devices as the active states if the power control device 160 receives a low signal L through the first wired communication H/W.

The power control device 160 determines whether the first communication device 141 is the sleep mode, and determines whether the remaining communication devices 142, 143, and 144 are also in the sleep mode if it is determined that the first communication device 141 is in the sleep mode.

Here, the first communication device 141 may be the B-CAN communication device connected to the power control device 160.

Determining whether the remaining communication devices 142, 143, and 144 are also in the sleep mode may include determining whether a first predetermined control signal, such as a high signal, has been received through the first wired communication H/W or H/Wire. Although FIG. 8 shows the high signal as the predetermined control signal, alternatively the predetermined control signal may be a low signal. In other words, the high signal and the low signal in FIG. 8 may be reversed.

In other words, the power control device 160 may determine that all communication devices are in the sleep mode if it is determined that the first predetermined control signal (e.g., a high signal) has been received through the first wired communication H/W or H/Wire (203). Here, all communication devices may be the remaining communication devices 142, 143, and 144 including the first communication device 141.

If the first communication device 141 is in the sleep mode (B-CAN: Sleep), and the first predetermined control signal (e.g., a high signal H) is received through the first wired communication H/W or H/Wire, so that it is determined that the remaining communication devices 142, 143, and 144 are also in the sleep mode, the power control device 160 switches the first power mode to the second power mode (204).

If it is determined that the first communication device 141 is in the non-sleep mode (B-CAN: Non sleep), even if the first predetermined control signal (e.g., a high signal) is received through the first wired communication H/W or H/Wire, the power control device 160 may determine the communication state of the vehicle as an abnormal state and maintain the first power mode.

The power control device 160 may determine that at least one of the remaining communication devices is not in the sleep mode if it is determined that a second predetermined control signal (e.g., a low signal L) has been received through the first wired communication H/W or H/Wire. In other words, the power control device 160 may determine that at least one of the remaining communication devices is in the non-sleep mode.

In other words, if it is determined that the second predetermined control signal (e.g., a low signal L) has been received through the first wired communication H/W or H/Wire, even if the first communication device 141 is in the sleep mode (B-CAN: Sleep), the power control device 160 may determine the communication state of the vehicle as the abnormal state and maintain the first power mode.

The power control device 160 determines whether the preset time has elapsed from the time point at which the ignition is turned off (205). Here, the preset time may be about 40 minutes.

If it is determined that the preset time has not elapsed from the time point at which the ignition is turned off, the power control device 160 may periodically determine whether the first communication device 141 is in the sleep mode and determine whether the first predetermined control signal (e.g., a high signal) has been received from the communicator 140. At this time, if it is determined that the first communication device is in the sleep mode and the first predetermined control signal (e.g., a high signal) has been received through the first wired communication H/W or H/Wire, the power control device 160 may determine that all communication devices are in the sleep mode and switch the first power mode to the second power mode.

The communication controller 145 of the communicator 140 may monitor the communication states of the plurality of communication devices while the ignition is turned off, and output the first predetermined control signal (e.g., a high signal) through the first wire communication if it is determined that the plurality of communication devices are all in the sleep mode.

In addition, the communication controller 145 of the communicator 140 may also monitor the communication states of the plurality of communication devices while the ignition is turned off, and output the first predetermined control signal (e.g., a high signal) through the first wired communication if it is determined that the remaining communication devices except the first communication device are all in the sleep mode.

The communication controller 145 of the communicator 140 may monitor the communication states of the plurality of communication devices if it is determined that the preset time has elapsed from the time point at which the ignition is turned off, output the first predetermined control signal (e.g., a high signal) through the first wired communication if it is determined that the plurality of communication devices are all in the sleep mode, and output the second predetermined control signal (e.g., a low signal) through the first wired communication if it is determined that at least one communication device is in the non-sleep mode.

In addition, the communication controller 145 of the communicator 140 may monitor the communication states of the plurality of communication devices if it is determined that the preset time has elapsed from the time point at which the ignition is turned off, output the first predetermined control signal (e.g., high signal) through the first wired communication if it is determined that the remaining communication devices except for the first communication device are all in the sleep mode, and output the second predetermined control signal (e.g., low signal) through the first wired communication if it is determined that at least one of the remaining communication devices is in the non-sleep mode.

The communication controller 145 of the communicator 140 may also monitor the communication states of the plurality of communication devices if it is determined that the preset time has elapsed from the time point at which the ignition is turned off, control the wake-up of the first communication device if it is determined that at least one of the plurality of communication devices is in the non-sleep mode, and control the first communication device in the sleep mode if the wake-up of the first communication device is completed.

If it is determined that at least one of the plurality of communication devices is in the non-sleep mode, the communication controller 145 of the communicator 140 may also control the wake-up of the communication device in the sleep mode and control the woken-up communication devices to be in the sleep mode.

The first communication device may be switched back to the sleep mode after waking up in response to the control of the communicator 140 after the preset time has elapsed from the time point at which the ignition is turned off. In addition, the first communication device may be maintained in the non-sleep mode in the abnormal state.

In the state in which the first power mode is performed, if it is determined that the preset time has elapsed from the time point at which the ignition is turned off, the power control device 160 may determine whether the first communication device 141 is in the sleep mode (206), and determine whether the first predetermined control signal (e.g., high signal) has been received from the communicator 140 (207).

If it is determined that the first communication device is in the sleep mode (B-CAN: Sleep) and the first predetermined control signal (e.g., a high signal H) has been received through the first wired communication H/W or H/Wire, the power control device 160 may determine that the plurality of communication devices are all in the sleep mode and switch the first power mode to the second power mode (208).

If it is determined that the first communication device is in the non-sleep mode (B-CAN: Non-sleep) or the second predetermined control signal (e.g., low signal L) has been received through the first wired communication H/W or H/Wire, the power control device 160 may determine the communication state of the vehicle as the abnormal state. At this time, the power control device determines that at least one of the plurality of communication devices is in the non-sleep mode and maintains the first power mode (209).

The power control device 160 confirms the battery charge amount 120 while being maintained in the first power mode (210).

The power control device 160 determines whether the confirmed charge amount is smaller than the predetermined charge amount (211), and monitors the communication states of the plurality of communication devices in the state of maintaining the first power mode if it is determined that the confirmed charge amount is greater than or equal to the preset charge amount.

The preset charge amount may be an SoC of 40%.

The power control device 160 may switch the first power mode to the third power mode (212) if it is determined that the confirmed battery charge amount is smaller than the preset charge amount. Therefore, the power supplied to the load may be cut off. In other words, the supply of the dark current may be cut off.

In addition, in the state of performing the second power mode after switching the first power mode to the second power mode (204 and 208), the power control device 160 may confirm the battery charge amount 120 (201), determine whether the charge amount is smaller than the preset charge amount (211), and switch the second power mode to the third power mode (212) if it is determined that the confirmed battery charge amount is smaller than the preset charge amount.

The power control device 160 may perform the first power mode if the power control device 160 receives the ignition ON command through the input device.

As described above, it is possible to confirm the communication states of the plurality of communication devices through the first wired communication with the communicator, and cut off the power supplied to the load in response to the communication states of the plurality of communication devices. Therefore, it is possible to efficiently manage the power of the vehicle in the ignition OFF state.

In addition, it is possible to prevent unnecessary power consumption while the vehicle is in the parked state, prevent the start fault by preventing the over-discharge of the battery, and extend the SoH of the battery.

It is possible to normalize the communication state of the communicator of the vehicle by initializing (resetting) the plurality of communication devices if it is determined that the communication state of the vehicle is the abnormal state in the ignition OFF state. Therefore, it is possible to prevent the start fault in response to the ignition ON command of the vehicle.

Meanwhile, the disclosed embodiments may be implemented in the form of a recording medium configured to store instructions executable by a computer. The instructions may be stored in the form of program code and may perform the operations of the disclosed embodiments by generating a program module when executed by a processor. The recording medium may be implemented as a computer-readable recording medium.

The computer-readable recording medium includes all types of recording media in which the instructions readable by the computer are stored. For example, there may be a read only memory (ROM), a random access memory (RAM), a magnetic tape, a magnetic disk, a flash memory, an optical data storage device, and the like.

According to one aspect of the present disclosure, it is possible to confirm communication states of a plurality of communication devices through wired communication with a communicator and cut off power supplied to a load in response to the communication states of the plurality of communication devices. Therefore, it is possible to efficiently manage the power of the vehicle in an ignition OFF state.

In addition, according to the present disclosure, it is possible to prevent unnecessary power consumption while a vehicle is in a parked state, prevent a start fault by preventing over-discharge of a battery, and extend a state of health (SoH) of the battery.

According to the present disclosure, it is possible to normalize a communication state of a communicator of a vehicle by initializing (resetting) a plurality of communication states if it is determined that a communication state of the vehicle is in an abnormal state in an ignition OFF state. Therefore, it is possible to prevent a start fault in response to an ignition ON command of the vehicle.

According to the present disclosure, it is possible to improve the merchantability of the vehicle, furthermore, enhance user satisfaction, improve the reliability of a user, and secure the competitiveness of a product.

The disclosed embodiments have been described with reference to the accompanying drawings as described above. Those skilled in the art to which the present disclosure pertains will understand that the present disclosure may be carried out in other forms than the disclosed embodiments without changing the technical spirit or essential features of the present disclosure. The disclosed embodiments are illustrative and should not be construed as being restrictive.

What is claimed is:

1. A power control device, comprising:
a communicator configured to perform first wired communication and second wired communication; and
a processor configured to:
receive, via the second wired communication, a first communication state of a first communication device among a plurality of communication devices of a vehicle;
receive, via the first wired communication, second communication states of remaining communication devices of the plurality of communication devices; and
control switching between power modes based on:
the first communication state,
the second communication states, and
a battery charge amount of the vehicle,
wherein the power modes comprise:
a first power mode,
a second power mode for supplying lower power than the first power mode, and
a third power mode, in which power supply is cut off, and
wherein the processor is further configured to:
determine, based on the first communication state and the second communication states, whether to control the plurality of communication devices to operate in a sleep mode; and
switch from the first power mode to the second power mode based on the plurality of communication devices operating in the sleep mode, and
wherein the processor is further configured to, when operating in the second power mode:
based on a determination that the battery charge amount is smaller than a threshold charge amount, switch from the second power mode to the third power mode.

2. The power control device of claim 1, wherein the processor is further configured to:
determine whether the plurality of communication devices are, after receiving an ignition OFF command of the vehicle, in an active state; and operate in the first power mode based on a determination that the plurality of communication devices are in the active state.

3. The power control device of claim 1, wherein the processor is further configured to:
   determine, based on the first communication state, whether the first communication device is in the sleep mode; and
   control the remaining communication devices to operate in the sleep mode based on receiving a predetermined control signal via the first wired communication.

4. The power control device of claim 1, wherein the processor is further configured to:
   switch from the first power mode to the third power mode based on the battery charge amount, and further based on at least one of the plurality of communication devices operating in a non-sleep mode.

5. The power control device of claim 4, wherein the processor is further configured to:
   determine, based on the first communication state, whether the first communication device is in the sleep mode; and
   determine that at least one of the remaining communication devices is in the non-sleep mode based on receiving a predetermined control signal via the first wired communication.

6. The power control device of claim 4, wherein the processor is further configured to:
   based on a determination that a threshold time amount has elapsed since an ignition of the vehicle was disengaged, and further based on a determination that the battery charge amount is smaller than a threshold charge amount, switch from the first power mode to the third power mode.

7. The power control device of claim 4, wherein the processor is further configured to:
   based on a determination that the plurality of communication devices are in the sleep mode, and before a threshold time amount has elapsed since an ignition of the vehicle was disengaged, switch from the first power mode to the second power mode.

8. A power control device, comprising:
   a communicator configured to perform first wired communication and second wired communication; and
   a processor configured to:
      receive, via the second wired communication, a first communication state of a first communication device among a plurality of communication devices of a vehicle;
      receive, via the first wired communication, second communication states of remaining communication devices of the plurality of communication devices; and
      control switching between power modes based on:
         the first communication state,
         the second communication states, and
         a battery charge amount of the vehicle,
   wherein the power modes comprise:
      a first power mode,
      a second power mode for supplying lower power than the first power mode, and
      a third power mode, in which power supply is cut off, and
   wherein the processor is further configured to:
      determine, based on the first communication state and the second communication states, whether to control the plurality of communication devices to operate in a sleep mode; and
      switch from the first power mode to the second power mode based on the plurality of communication devices operating in the sleep mode,
   wherein the processor is further configured to, when operating in the second power mode:
      based on a determination that the battery charge amount is smaller than a threshold charge amount, switch from the second power mode to the third power mode,
   wherein the first communication device is configured to perform body controller area network (CAN) communication, and
   wherein the remaining communication devices are configured to perform CAN communication other than the body CAN communication.

9. A vehicle comprising:
   a battery configured to supply power to a plurality of loads;
   a communicator configured to perform first wired communication, wherein the communicator comprises:
      a plurality of communication devices, and
      a communication controller; and
   a power control device configured to:
      communicate with the communicator via a first communication device of the plurality of communication devices and via the first wired communication; and
      control switching between power modes based on:
         a first communication state, of the first communication device, received via the first communication device,
         second communication states, of remaining communication devices, received via the first wired communication, and
         a battery charge amount of the battery,
   wherein the power modes comprise:
      a first power mode,
      a second power mode for supplying lower power than the first power mode, and
      a third power mode, in which power supply is cut off,
   and wherein the power control device is further configured to:
      determine, based on the first communication state, whether the first communication device is in a sleep mode;
      determine, based on receiving a predetermined control signal via the first wired communication and further based on the first communication device operating in the sleep mode, that the remaining communication devices are in the sleep mode; and
      switch from the first power mode to the second power mode based on the remaining communication devices operating in the sleep mode, and
   wherein the power control device is further configured to, based on a determination that the battery charge amount is smaller than a threshold charge amount, switch from the second power mode to the third power mode.

10. The vehicle of claim 9, wherein the first communication device is configured to perform body controller area network (CAN) communication,
   wherein the remaining communication devices are configured to perform CAN communication other than the body CAN communication.

11. The vehicle of claim 10, wherein the power control device is further configured to:
- determine whether the plurality of communication devices are, after receiving an ignition OFF command of the vehicle, in an active state; and
- operate in the first power mode based on a determination that the plurality of communication devices are in the active state.

12. The vehicle of claim 11, the power control device is further configured to, when operating in the first power mode:
- determine that at least one communication device of the remaining communication devices is in a non-sleep mode based on receiving a predetermined control signal via the first wired communication;
- determine whether the battery charge amount is smaller than a preset charge amount based on the at least one communication device operating in the non-sleep mode or the first communication device operating in the non-sleep mode; and
- switch from the first power mode to the third power mode based on a determination that the battery charge amount is smaller than the preset charge amount.

13. The vehicle of claim 12, wherein the power control device is further configured to switch from the first power mode to the second power mode based on a determination that the plurality of communication devices are in the sleep mode before a threshold time amount has elapsed since an ignition of the vehicle was disengaged.

14. The vehicle of claim 12, wherein the communication controller is further configured to, after a threshold time amount has elapsed since an ignition of the vehicle is disengaged, monitor the first communication state and the second communication states; and
- control at least one communication device to operate in the sleep mode based on a determination that the at least one communication device is operating in the non-sleep mode.

15. The vehicle of claim 9, wherein the communication controller is further configured to:
- output a first predetermined control signal via the first wired communication based on the remaining communication devices operating in the sleep mode; and
- output a second predetermined control signal via the first wired communication based on at least one of the remaining communication devices operating in a non-sleep mode.

16. The vehicle of claim 9, wherein the first communication device is a body controller area network (B-CAN) communication device, and
- wherein each of the remaining communication devices is a non-B-CAN communication device and is configured to perform CAN communication other than a B-CAN communication.

* * * * *